United States Patent [19]
Fink et al.

[11] Patent Number: 5,342,089
[45] Date of Patent: Aug. 30, 1994

[54] COMBINED AIR BAG DEVICE AND STEERING COLUMN FOR VEHICLES

[75] Inventors: Michael F. Fink; Larry D. Hoagland, both of Hamilton County, Ind.

[73] Assignee: Ideatech, Inc., Fishers, Ind.

[21] Appl. No.: 3,584

[22] Filed: Jan. 13, 1993

[51] Int. Cl.$^5$ .............................................. B60R 21/26
[52] U.S. Cl. ...................................... 280/731; 280/737
[58] Field of Search .............. 280/731, 730 R, 728 R, 280/728 A, 737, 736, 740; 222/5; 220/89.2

[56] References Cited

U.S. PATENT DOCUMENTS

| | | | |
|---|---|---|---|
| 822,826 | 6/1906 | Coleman | 222/54 |
| 3,197,234 | 7/1965 | Bertrand | 280/737 |
| 3,552,770 | 1/1971 | Berryman | 280/740 |
| 3,600,003 | 8/1971 | Carey | 280/731 |
| 3,632,135 | 1/1972 | Chute | 280/731 |
| 3,749,282 | 7/1973 | Day et al. | 222/5 |
| 3,774,932 | 11/1973 | Schiesterl | 280/731 |
| 3,801,123 | 4/1974 | Jira | 280/731 |
| 3,822,895 | 7/1974 | Ochiai | 280/737 |
| 3,873,125 | 3/1975 | Bendler et al. | 280/731 |
| 3,982,774 | 9/1976 | Ivashuk et al. | 280/737 |
| 4,219,126 | 8/1980 | Oana | 220/89.2 |
| 5,152,550 | 10/1992 | Hoagland et al. | 280/737 |

FOREIGN PATENT DOCUMENTS 2132018  6/1984  United Kingdom ............... 220/89.2

OTHER PUBLICATIONS

"Passenger Car Inflatable Restraint Systems", D. C. Viano, Society of Automotive Engineers 1986, Paper No. 720049 pp. 103–105.

"Pressure Vessels Catalog, Arde Inc.," Revisions 15–18, May 30, 1990 to Feb. 27, 1992, pp. ii, iv.

Primary Examiner—Karin L. Tyson
Attorney, Agent, or Firm—Jack Schuman

[57] ABSTRACT

Combined air bag device and steering column, for use on a vehicle having collision-sensing means and a steering wheel to communicate steering directions to steering mechanism, comprises in one embodiment a hollow tubular steering column connected at its upper end to the steering wheel and at its lower end to the steering mechanism. An elongated tubular reservoir containing pressurized fluid prior to collision is mounted within the hollow tubular steering column, and has an outlet at the upper end thereon. An inflatable cushion is mounted on the steering wheel and closure means is interposed between the outlet of the reservoir and the inlet of the cushion. Opening means, responsive to a signal generated by the collision-sensing means, rapidly opens the closure means thereby to inflate the cushion. In another embodiment, the tubular reservoir is connected at its upper end to the steering wheel and at its lower end to the steering mechanism to function as a steering column communicating rotation of the steering wheel to the steering mechanism.

12 Claims, 7 Drawing Sheets

COMBINED AIR BAG DEVICE AND STEERING COLUMN FOR VEHICLES

BACKGROUND OF THE INVENTION (1) Field of the Invention

This invention relates, broadly speaking, to a safety device for vehicles.

More particularly, this invention relates to an improved air bag device for a vehicle, the high-pressure fluid reservoir of which device is mounted completely within the steering column of the vehicle.

(2) Description of the Prior Art

Air bag devices for vehicles are known and generally comprise a reservoir for holding highly pressurized fluid, or in which highly pressurized fluid is generated as hot products of combustion resulting from the ignition of rapidly combustible material, or a combination of both sources of pressurized fluid. The reservoir has an exit provided with a seal of one sort or another which prevents the escape of pressurized fluid into an air bag which is coupled, directly or indirectly, to the reservoir. In the event of a collision, the seal is opened, and pressurized fluid escapes from the reservoir into the air bag to inflate it.

An air bag requires a certain number of cubic feet of fluid for proper effective inflation.

A typical air bag for placement on the driver's side of the vehicle has an inflated volume of 1.6-2.3 cubic feet. For a 2.3 cubic foot air bag which is to be inflated, for example, solely by fluid which is stored in a reservoir under pressure prior to a collision and not by or with the aid of hot products of combustion resulting from the ignition of rapidly combustible material such as AR-CITE. If the volume of the reservoir is 50 cubic inches, the pressure of the fluid in the reservoir prior to deployment of the air bag will be approximately 1700 psi for proper effective inflation of the air bag. For this same air bag, under the same operating conditions, if the volume of the reservoir is 28 cubic inches, the pressure of the fluid in the reservoir prior to deployment of the air bag will be approximately 3000 psi for proper effective inflation of the air bag.

Smaller reservoirs are generally desirable so that they may be fitted into smaller and more conveniently situated locations in the vehicle. The smaller the reservoir supplying pressurized fluid, the higher must be the pressure of the fluid in the reservoir to properly and effectively inflate the air bag in the event of a collision.

Notable improvements in air bag devices are disclosed in U.S. Pat. No. 5,152,550 (1992) in the names of Larry D. Hoagland and Stephen J. Brockman, in U.S. patent application Ser. No. 07/940,981 filed in the names of Stephen J. Brockman, Larry D. Hoagland and Michael F. Fink, in U.S. patent application Ser. No. 07/964,395 filed in the names of Stephen J. Brockman and Michael F. Fink, and in U.S. patent application Ser. No. 07/987,362 filed in the names of Stephen J. Brockman, Michael F. Fink and Larry D. Hoagland, all assigned to the assignee of the present invention. The aforesaid patent and patent applications, while meritorious in themselves, neither disclose nor suggest the unique combination of the high-pressure fluid reservoir of the air bag device with the steering column of the vehicle disclosed herein.

SUMMARY OF THE INVENTION

One of the objects of this invention is to provide an air bag device with a novel placement of the pressurized fluid reservoir completely in the steering column of the vehicle.

Another of the objects of this invention is to provide an air bag device with a novel placement of the pressurized fluid reservoir completely in the steering column of the vehicle and as part of the steering mechanism of the vehicle.

Other and further objects of this invention will become apparent by reference to the accompanying specification, the drawings, and the appended claims.

Briefly, the foregoing objects are attained, in one embodiment, by employing a tubular steering column which communicates between the steering wheel of the vehicle and the gear box, and mounting completely within the hollow of said tubular steering column an elongated tubular reservoir for pressurized fluid. In another embodiment of this invention, the foregoing objects are attained by providing an elongated tubular reservoir for pressurized fluid in the form of a hollow steering column which also serves as the mechanical link communicating the steering motion of the steering wheel to the gear box.

DESCRIPTION OF THE DRAWINGS

Referring now to the drawings, in which like numerals represent like parts in the several views.

DESCRIPTION OF THE PREFERRED EMBODIMENTS

Conventional steering apparatus for vehicles generally comprises a steering wheel 1 which is connected to the upper end of a steering column, whereby rotation of the steering wheel 1 is transmitted to the steering column.

The bottom end of the conventional steering column is connected, through a conventional swivel joint (not shown), to the upper end of a shaft (not shown) which is located below the floorboard of the vehicle. The bottom end of this shaft is connected to a gear box or the like (not shown) controlling those wheels of the vehicle which determine its direction of travel. In this manner, rotation of steering wheel 1 controls the direction of travel of the vehicle.

The conventional steering column, and the shaft below the swivel joint generally include an energy absorbing feature such as the ability to collapse or telescopically retract in the event of a collision to prevent impalement of the driver. Such energy absorbing feature may include a linear sliding capability, and is shown only diagrammatically in the drawings and forms no part of the present invention.

The conventional steering column 2 is generally rotatably mounted within a sleeve 3, to which are attached various controls (not shown) for turn signals and other functions.

Sleeve 3 is generally secured to vehicle structure such as the dashboard by means of mounts 4.

Housing 5 containing inflatable air bag or cushion 6 is conventionally mounted in the central portion or hub of steering wheel 1. The top of housing 5 is generally a scored lid which is readily popped open without significant effort or delay when air bag 6 is deploying in the event of a collision. Housing 5 forms no part of the present invention and need not be described in detail.

Figure 1:
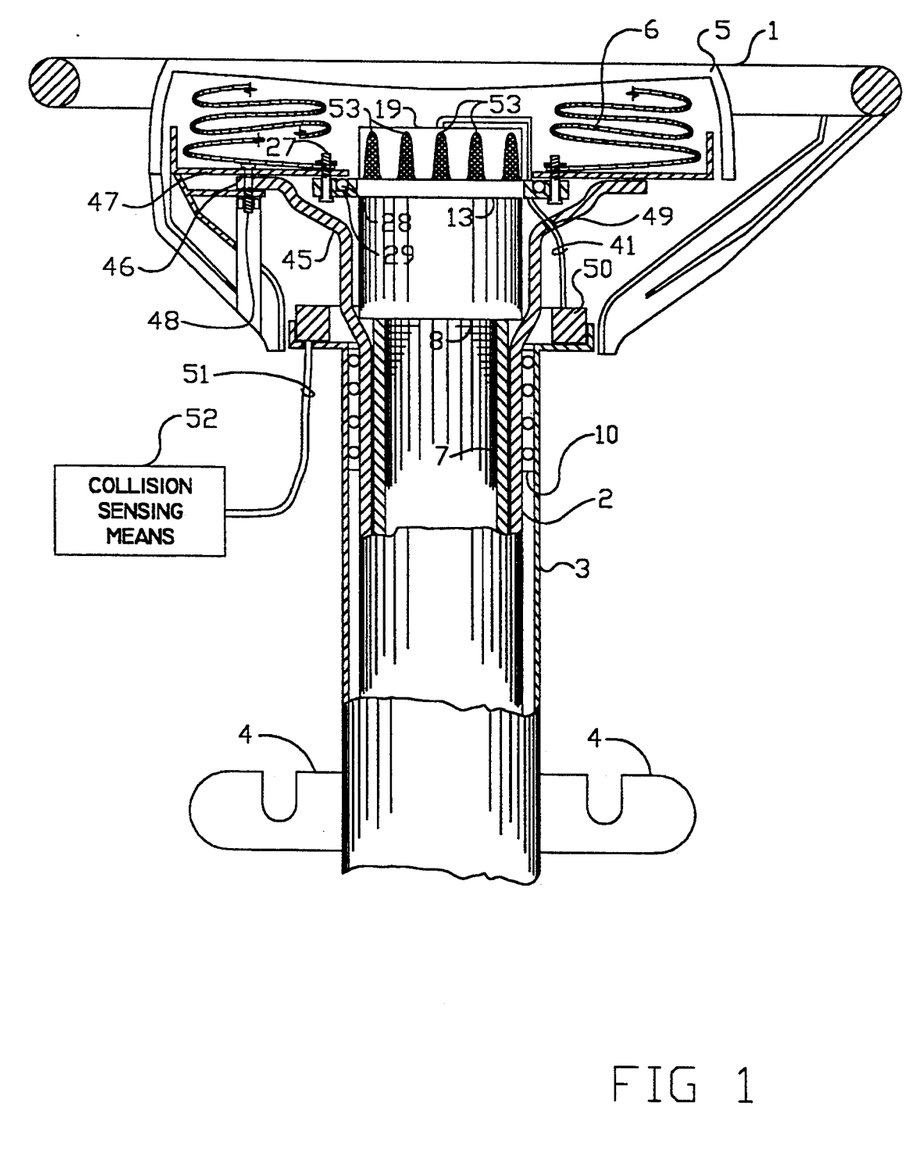
FIG. 1 represents a medial partial section, partially diagrammatic, of one embodiment of the present invention wherein the elongated tubular reservoir is mounted within the hollow of a tubular steering column, showing the upper end of the tubular reservoir and a tubular steering column.
Figure 2:
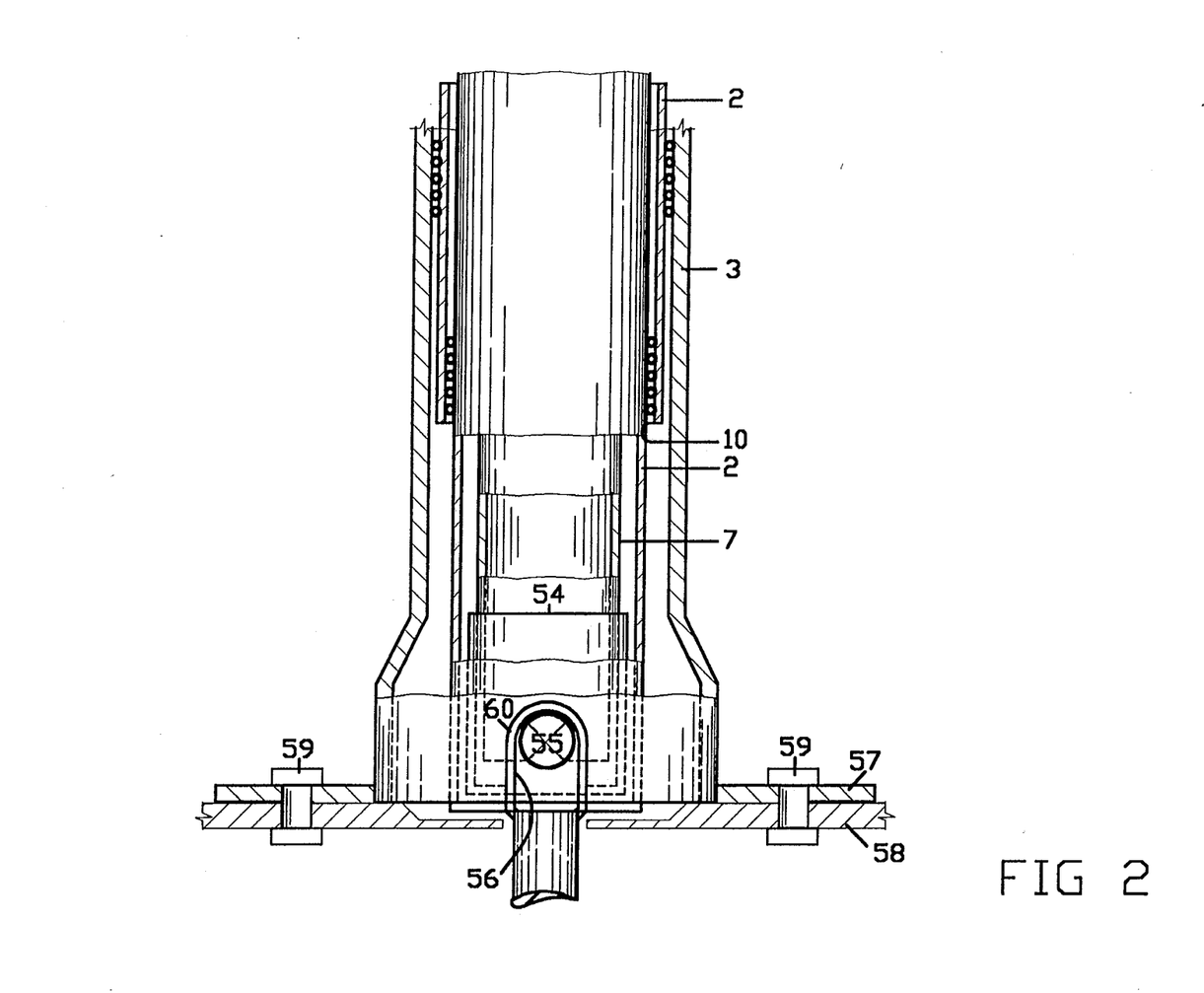
FIG. 2 represents a medial section of the embodiment of FIG. 1, showing the lower end of the tubular reservoir and tubular steering column.

In the embodiment of the present invention shown in FIGS. 1 and 2, apparatus for inflating air bag 6 is seen as comprising elongated tubular reservoir 7 adapted to contain pressurized fluid, manifold 8 and frangible plate 9 interposed between manifold 8 and air bag 6. Steering column 2 is hollow, and elongated tubular reservoir 7 is mounted completely within the hollow of said steering column 2.

For example, sleeve 3 may be large enough to enclose a steering column 2 of length and internal diameter in turn sufficient to enclose tubular reservoir 7 having an inner diameter of 1.5 inches and a length of 25 inches. Such tubular reservoir 7 has a volume of approximately 44 cubic inches and will hold sufficient pressurized fluid at approximately 1900 psi to properly and effectively inflate an air bag of 2.3 cubic feet.

Rotary support bearings 10, shown diagrammatically in FIGS. 1 and 2, are interposed between sleeve 3 and steering column 2.

Elongated tubular reservoir 7 preferably is of "leak-before-bursting" (LBB) construction and may be made from a fluid-impermeable hose, elastomeric in character, reinforced by metallic or synthetic fiber, carbon fiber, braiding, weaving, stranding, winding, wrapping or the like. In the event that a flaw should develop in the wall of reservoir 7 of leak-before-bursting construction, the wall will be tough enough to permit pressurized fluid contained in said reservoir 7 to slowly leak through the flaw in a benign manner. This behavior of a leak-before-bursting reservoir 7 is quite different from the behavior exhibited by the wall of a reservoir of less tough or brittle material in which a flaw in such wall becomes unstable, propagates and causes a catastrophic failure. Tubing or hose suitable for a leak-before-bursting reservoir 7 may, for example, be of the type manufactured by HBD Industries, Inc. and sold by them under their trademarks FLEXCURVE and THERMOID. Such tubing or hose may also be of the type manufactured by the Hose Products Division of Parker Hannifin Corp. and sold by them under their trademark NO-SKIVE.

Reservoir 7 can also be of suitable metallic construction of leak-before-bursting character having a tough, damage-tolerant wall. Such metallic construction may, for example, be the result of cryoforming to produce a dual phase alloy composed of a very tough austenitic matrix with interlocking platelets of high strength martensite.

Manifold 8 is provided with bore 10 receiving the upper end of reservoir 7 in fluid-tight relationship. The upper end of reservoir 7 may be threaded, in which event bore 10 will be threaded, and the upper end of reservoir 7 tightly screwed therein. Other means for fluid-tightly coupling the upper end of reservoir 7 to bore 10 of manifold 8 will be apparent to those familiar with this art. Alternatively, manifold 8 may be formed integrally with the conventional fitting which is crimped to the end of a hose.

Bore 10 is generally aligned with the longitudinal axis of manifold 8 and communicates with central aperture 11 at the opposite end of manifold 8.

Figure 3:
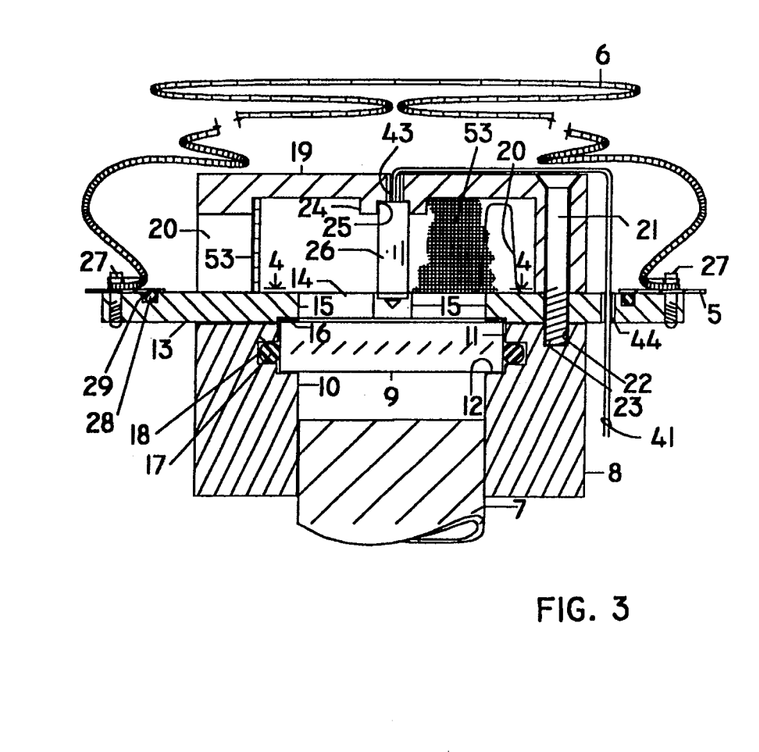
FIG. 3 represents a medial section of the upper end of the tubular reservoir and of the frangible plate and actuator for shattering the frangible plate.
Figure 4:
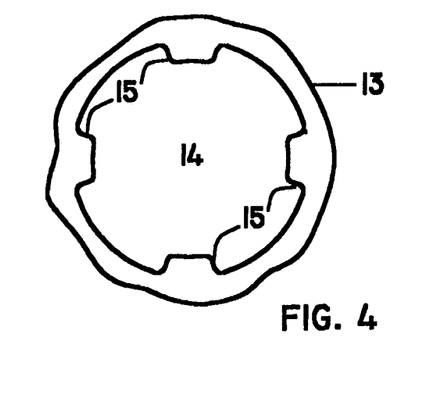
FIG. 4 represents a partial view in plan of the closure plate as seen from line 4—4 of FIG. 3.

It will be noted from FIG. 3 that the diameter of central aperture 11 is greater than the diameter of bore 10, so as provide a ledge 12 extending completely around bore 10.

Frangible plate 9 is made of brittle material such as glass and preferably tempered glass, ceramic, porcelain, brittle alloys or mixtures or composites, brittle sintered members, brittle plastics or polymeric, or other brittle material, and is characterized by its tendency to undergo extremely rapid multi-directional crack propagation when struck with sufficient force and thus to rapidly shatter into numerous discrete fragments. In other words, frangible plate 9 virtually instantaneously disintegrates when struck a shattering blow. Plates or discs similar in function to frangible plate 9 are well known in the art of containing pressurized fluid and are sometimes referred to as "bursting discs."

Closure plate 13 is provided with central aperture 14 and radially spaced lips 15 extending partially into central aperture 14.

A cushion gasket 16 is positioned in central aperture 14 around the upper periphery of frangible plate 9.

Elastomeric peripheral damper mount 17 is received in circumferential recess 18 in manifold 8, and bears against the periphery of frangible plate 9.

Frangible plate 9 has sufficient strength to withstand the pressure exerted on its bottom or high-pressure face by pressurized fluid in reservoir 7, and does not require any support against such pressure other than the peripheral support of lips 15 on closure plate 13, thus leaving the major central area of frangible plate 13 totally unobstructed.

It will be apparent, from time drawings, that the vertically unobstructed portion of central aperture 14 in closure plate 13 is, from the fluid-flow standpoint, virtually the same as the major central area of frangible plate 9.

Cylindrical filter housing 19 provided with radially spaced apertures 20 is bolted to manifold 8, coaxially with central aperture 14 as shown, by means of radially spaced bolts 21 (only one of which is shown) extending through apertures 22 in closure plate 13 and threaded into threaded apertures 23 in manifold 8.

Frangible plate 9 is supported just below central aperture 14 of closure plate 13 by means of ledge 12 bearing against the bottom periphery of frangible plate 9. Bolts 21 force filter housing 19 down and against closure plate 13 thereby forcing lips 15 to bear, through cushion gasket 16, against the upper periphery of frangible plate 9.

When bolts 21 are threaded into threaded apertures 23 and sufficiently tightened so as to compress cushion gasket 16, brittle frangible plate 9 is in effect held in elastomeric material and thereby is protected against unintended forces such as mechanical vibrations which otherwise might shatter it and prematurely release pressurized fluid from reservoir 7.

Filter housing 19 is provided with internal boss 24 having counterbore 25 receiving actuator 26 which is suitably secured therein by means known to those familiar with this art.

Air bag 6 is secured to the bottom of housing 5 and, through housing 5 to closure plate 13, by means of radially spaced bolts 27 (only two of which are shown). O-ring seal 28, mounted in circumferential recess 29 in closure plate 13, assures a fluid-tight coupling of air bag 6 to closure plate 13 around filter housing 19.

Figure 5:
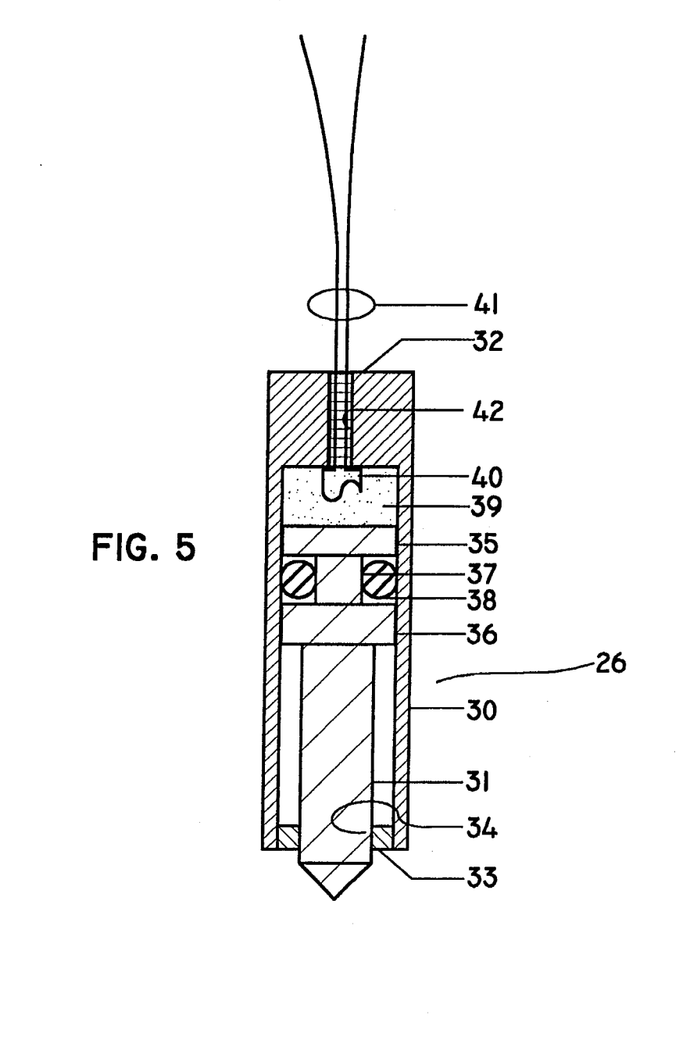
FIG. 5 represents an enlarged medial partial section of the actuator, showing the portion of the striking member mounted therein prior to a collision.

Actuator 26 consists of cylinder 30 and striking member 31 slidably mounted therein.

The upper end of cylinder 30, which is that end remote from frangible plate 9, is sealed shut by closure means, for example by plate 32 which may be formed integrally with cylinder 30 or which may be a separate piece suitably secured to the upper end of cylinder 30.

Guide means, preferably plate 33 having a central orifice 34 extending therethrough, is secured, by suitable means such as threading, cementing, soldering or brazing, in the bottom end of cylinder 30. Orifice 34 is coaxial with the longitudinal axis of cylinder 30.

Striking member 31 in cylinder 30 has a diameter slidably fitting within orifice 34. The front or bottom end of striking member 31, that end used to shatter frangible plate 9, is conically shaped to bring it to a point. Preferably, the conical tip of striking member 31 is made of hardened steel having a Rockwell C hardness of 50-52. The rear or upper end of striking member 31 is provided with piston 35 slidably engaging the inner periphery of cylinder 30. Piston 35 may be formed integrally with striking member 31, or may be secured to striking member 31 in a manner known to those familiar with this art. Vertically spaced from piston 35, along the longitudinal axis of striking member 31, is a second piston 36 formed integrally with or otherwise secured to striking member 31. The diameter of striking member 31 is reduced at 37, and an O-ring seal 38 is maintained in position around section 37 of striking member 31, between pistons 35 and 36.

It will be seen that, in the event of a collision, striking member 31 is guided along its longitudinal axis in travelling to shattering engagement with frangible plate 9 by means of pistons 35 and 36 sliding in cylinder 30 and striking member 31 sliding in orifice 34. It will be apparent that the conical end of striking member 31, prior to collision, is positioned in close proximity to, but not in contact with, the low pressure or downstream face of frangible plate 9, and that the length of guided engagement of striking member 31 in cylinder 30 is greater than the distance striking member 31 must travel to shatter frangible plate 9 in the event of a collision.

Between the piston 35 and plate 32 is placed a small portion of explosive 39, preferably lead styphnate and typically no more than 10 milligrams. Electrical ignition means 40, preferably a length of nichrome wire, is positioned between piston 35 and plate 32 and is covered by explosive 39. A pair of electrical leads 41, connected at one end to the ends of ignition means 40, passes through hermetically sealed aperture 42 in plate 32, thence through hermetically sealed aperture 43 in filter housing 19, across the top of and down the side of filter housing 19 within the perimeter of air bag 6, and through hermetically sealed aperture 44 in closure plate 13.

It will be seen that steering column 2 is provided at its upper end with belled or flared portion 45 terminating in flange 46. Steering wheel 1 is formed with inwardly projecting flange 47 which is bolted to flange 46 by means of bolts 48 (only one of which is shown). Means other than the specific means shown herein may be employed to secure steering wheel 1 to steering column 2.

An aperture 49 is provided in belled portion 45 of steering column 2.

The pair of electrical leads 41 passes from hermetically sealed aperture 44 through aperture 49 and is connected to one end of coiled conductors 50 conventionally known as a clock spring, shown diagrammatically in FIG. 1, the details of which form no part of the present invention and which, therefore, are not shown.

The opposite end of coiled conductors 50 is connected to a second pair of electrical leads 51 which are in turn connected to collision sensing means 52 mounted on the vehicle and shown diagrammatically.

Coiled conductors 50 permit a continuous electrical circuit to be maintained between actuator 26, which rotates with rotation of steering wheel 1, and collision sensing means 52, without the interposition of electrical brushes between such relatively rotating parts. Rotation of steering wheel 1 in one direction or the other will coil or uncoil coiled conductors 50 and electrical continuity of the circuit will not be interrupted. It will, however, be understood, that the present invention is not limited to the use of clock spring electrical conductors, and other means including electrical brushes may be employed, if desired, to maintain the continuity of the electrical circuit between actuator 26 and the collision sensing means 52.

Filter 53 is positioned within filter housing 19, extending around the inner periphery thereof and thus being interposed between all apertures 20 and the interior of filter housing 19. Filter 53 is preferably a screen mesh of suitable material, and is provided to prevent the numerous discrete fragments resulting from the shattering of frangible plate 9 from entering air bag 6.

The bottom of tubular reservoir 7 is sealed shut by means of end cap 54 secured thereto. Valve 55 is screwed in the wall of end cap 54 and is the means through which pressurized fluid is introduced into said tubular reservoir 7.

Opening 56 is provided in the wall of steering column 2 for easy access to valve 55.

Sleeve 3, which has mounting flange 57 formed thereon and which may be secured to the floorboard 58 of the vehicle by means of radially spaced bolts 59, is flared out as shown to provide clearance for the projecting end of valve 55. Similarly, opening 60 is provided in the flared portion of sleeve 3 to provide access to valve 55 when tubular reservoir 7 is rotated to align valve 55 with opening 60.

In the operation of the embodiment of FIGS. 1-2, tubular reservoir 7 will be filled with fluid from a source of pressurized fluid, which fluid may, for example, be air, carbon dioxide, argon, nitrogen and mixtures thereof, through valve 55, to the proper pressure level required to rapidly and fully inflate air bag 6. The desired pressure level will be indicated by a pressure gauge (not shown). Preferably, a pressure tap will be provided somewhere on tubular reservoir 7, and the internal pressure of the reservoir communicated through suitable lines and connectors to the pressure gauge which will be suitably mounted for easy reading by the driver of the vehicle, for example on the steering wheel 1 or on the dashboard of the vehicle.

Normally, tile pressure level of the fluid in reservoir 7 will be maintained at the desired level indefinitely, unless and until the air bag 6 is inflated in response to a collision.

If the reservoir 7 is designed with leak-before-bursting characteristics, as hereinbefore described, and if prior to collision a flaw in the wall of the reservoir 7 develops for any reason, pressurized fluid will slowly leak through the flaw, rather than catastrophically bursting therethrough. The occurrence of a leak of pressurized fluid through the wall of reservoir 7 may or may not be audible. In any event, the pressure gauge will, because of a reduced reading, indicate the existence of such leak of pressurized fluid.

When such leak has been detected, the prudent driver will promptly bring the vehicle to a service station or to an automobile dealership where the leak may be suitably repaired on the reservoir 7 replaced.

Removing reservoir 7 for mending or replacement will be a simple operation. Steering wheel 1 will be rotated until valve 55 and opening 56 in the steering column 2 are aligned with opening 60 in sleeve 3. Access to valve 55 having been established, valve 55 is opened to permit pressurized fluid within reservoir 7 to be discharged. If valve 55 projects too far beyond reservoir 7 to clear that portion of steering column 2 above the flared bottom of steering column 2, valve 55 may be removed from end cap 54 by unscrewing it. Steering wheel 1 is then unbolted and freed from the top of steering column 2, and electrical leads 41 disconnected from coiled conductor 50. Steering wheel 1 then may be raised to withdraw elongated tubular reservoir 7 from the interior of steering column 2. The flawed reservoir 7 may be repaired or may be replaced by a new reservoir 7, and the repaired or replaced reservoir 7 inserted into steering column 2 as before.

With reservoir 7 filled with pressurized fluid to the appropriate level, the invention disclosed herein is ready for its intended use in the event of a collision.

If a collision involving the vehicle occurs, the collision-sensing means 52, which is mounted on the vehicle and which may, for example, be an electrical contact switch or a motion detector such as a inertial switch or an accelerometer, closes an electrical circuit and thereby sends an electrical signal to the air bag device.

This electrical signal, passing through electrical leads 51, coiled conductors 50, electrical leads 41 and ignition means 40, will ignite the explosive lead styphnate 39, rapidly generating combustion gases which act against piston 35, thus driving striking member 31 along its longitudinal axis into frangible plate 9 so as to rapidly shatter the same and virtually instantaneously permit the passage of pressurized fluid from reservoir 7, manifold 8, apertures 11 and 14, through filter 53 and apertures 20 in filter housing 19, into air bag 6.

The shattering effect of striking member 31 on frangible plate 9 permits the virtually instantaneous escape of pressurized fluid from reservoir 7 into air bag 6, deploying air bag 6 by inflating it. In the course of being inflated, air bag 6 pops open the scored lid of housing 5 without effort and without being retarded from full deployment.

Figure 6:
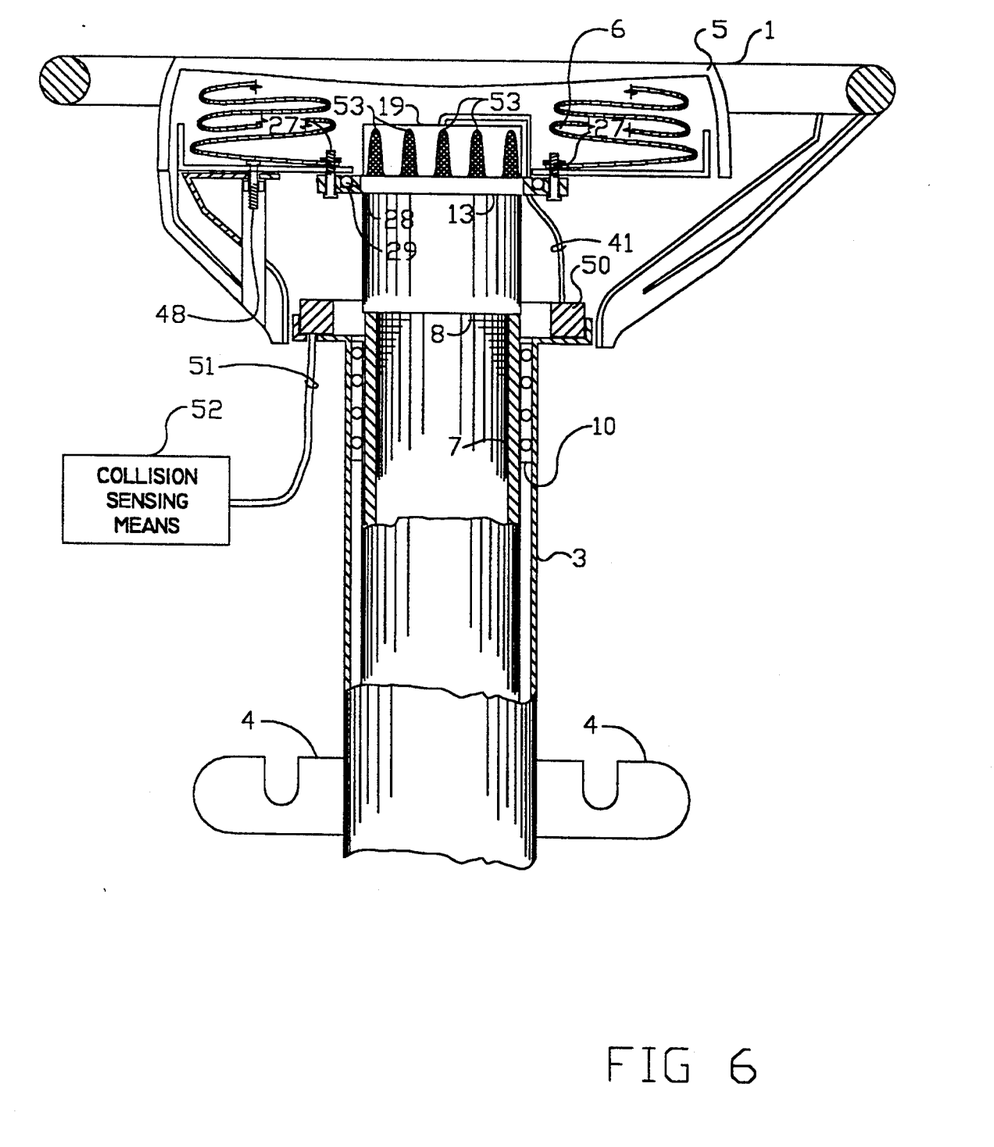
FIG. 6 represents a medial partial section, partially diagrammatic, of another embodiment of the present invention wherein the tubular reservoir also functions as the steering column, showing the upper end of the tubular reservoir.
Figure 7:
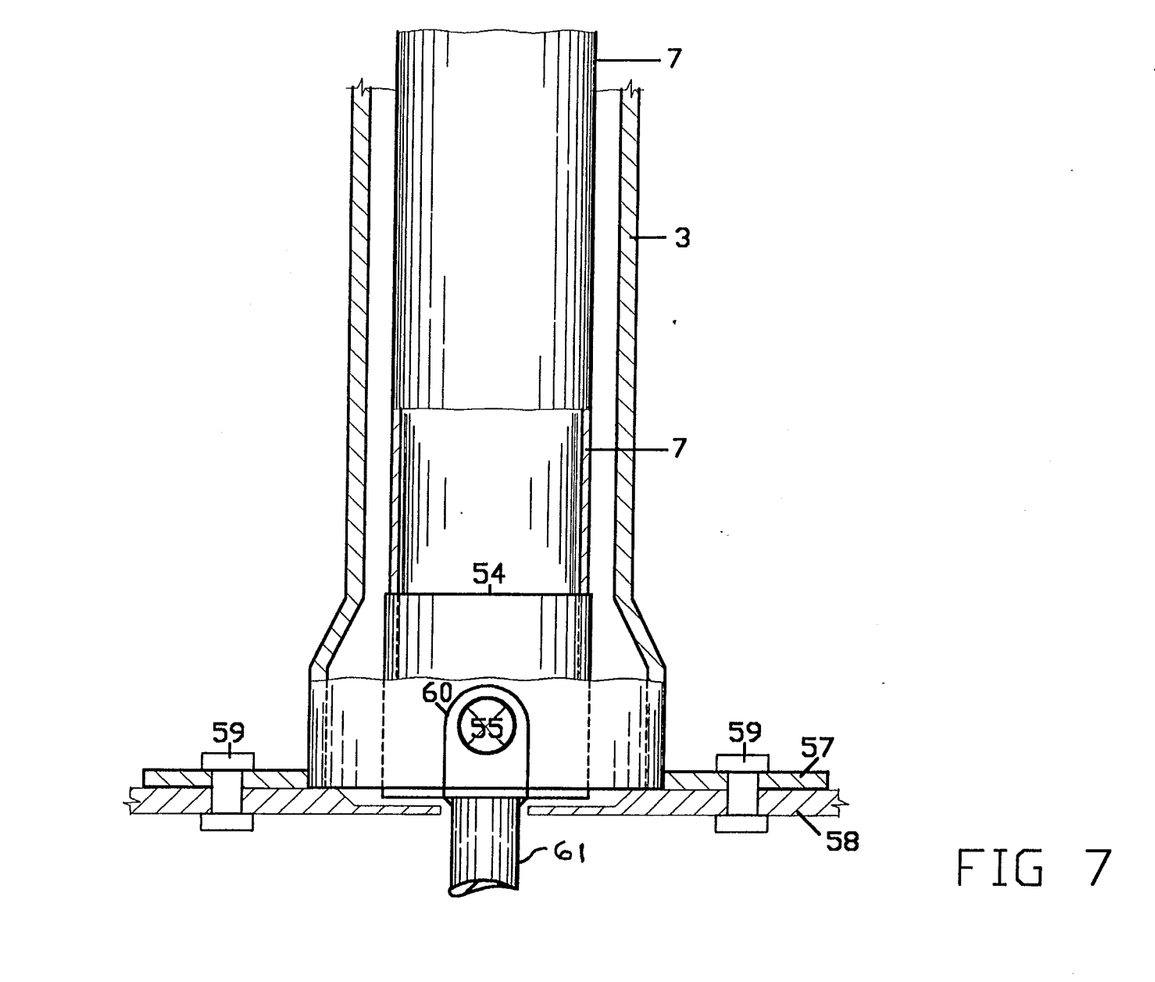
FIG. 7 represents a medial section of the embodiment of FIG. 6, showing the lower end of the tubular reservoir.

In the embodiment of FIGS. 6–7, the steering column 2 of the embodiment of FIGS. 1–2 has been eliminated, and tubular reservoir 7 itself functions as a steering column connected to steering wheel 1 and interposed as a rotation-transmitting mechanical link between the said steering wheel 1 and the gear box.

End cap 54, sealing shut the bottom of reservoir 7, is directly connected to shaft 61 which, in turn, is connected to the swivel joint (not shown).

Except for the features noted in the preceding two paragraphs, the construction and operation of the embodiment of FIGS. 6–7 is identical with the construction and operation of the embodiment of FIGS. 1–2.

Obviously, if reservoir 7 in the embodiment of FIGS. 6–7 is to be withdrawn from sleeve 3 for repair or replacement, the connection between shaft 61 and the swivel joint must be broken.

The foregoing specification is illustrative of the principles of the invention. Since modifications and changes which do not depart from tile spirit of the invention may readily occur to those skilled in the art to which this invention pertains, this invention should not be considered as limited to the exact apparatus shown and described herein, and the appended claims should be construed as covering suitable modifications and equivalents.

We claim:

1. For use in a vehicle having a steering wheel to communicate steering directions to a steering mechanism, and having collision-sensing means mounted thereon to rapidly generate a signal in response to a collision, a combined air bag device and steering column comprising:
   (a) a hollow tubular steering column having an upper end and a lower end, said upper end adapted to be connected to said steering wheel and said lower end adapted to be connected to said steering mechanism, whereby rotation of said steering wheel is communicated through said steering column to said steering mechanism to control the direction of travel of said vehicle,
   (b) an elongated tubular reservoir positioned within said hollow tubular steering column, said reservoir containing prior to collision a pressurized fluid and having an outlet at the upper end thereof, said tubular reservoir being removable from said steering column longitudinally thereof, the lower end of said tubular reservoir being free of any connection to said steering mechanism,
   (c) an inflatable cushion mounted on said steering wheel and having an inlet, said inflatable cushion being inflated by pressurized fluid from said reservoir in the event of said collision to protect the driver of said vehicle from injury,
   (d) closure means interposed between the outlet of said reservoir and the inlet of said inflatable cushion and preventing the passage of pressurized fluid from said reservoir to said inflatable cushion,
   (e) opening means to rapidly open said closure means in response to a signal generated by said collision-sensing means thereby to rapidly inflate said inflatable cushion.

2. Apparatus as in claim 1, wherein:
   (f) said closure means is a frangible plate which rapidly shatters into discrete fragments when struck,
   (g) said opening means comprises:

(i) a striking member having a first end to strike said frangible plate and a second end opposite said first end, (ii) driving means to rapidly apply a force to the second end of said striking member in response to a signal generated by said collision-sensing means to drive said striking member into shattering engagement with said frangible plate.

3. Apparatus as in claim 1, wherein:

(f) said closure means is a frangible plate having an upstream side facing the outlet of said reservoir and a downstream side opposite said upstream side, said frangible plate rapidly shattering into discrete fragments when struck, (g) said opening means comprises:

(i) a striking member adjacent the downstream side of said frangible plate and having a first end to strike said frangible plate and a second end opposite said first end, (ii) driving means to rapidly apply a force to the second end of said striking member in response to a signal generated by said collision-sensing means to drive such striking member into shattering engagement with said frangible plate.

4. Apparatus as in claim 1, further comprising:

(f) valve means mounted in the wall of said tubular reservoir, through which valve means when open pressurized fluid may be introduced into said tubular reservoir, and by means of said valve means when closed pressurized fluid may be held in said tubular reservoir, (g) an opening in the wall of said steering column to provide access to said valve means.

5. Apparatus as in claim 1, further comprising:

(f) filter means interposed between said closure means and the inlet of said inflatable cushion.

6. For use in a vehicle having a steering wheel to communicate steering directions to a steering mechanism, and having collision-sensing means mounted thereon to rapidly generate a signal in response to a collision, a combined air bag device and steering column comprising:

(a) a hollow tubular steering column having an upper end and a lower end, said upper end adapted to be connected to said steering wheel and said lower end adapted to be connected to said steering mechanism, whereby rotation of said steering wheel is communicated through said steering column to said steering mechanism to control the direction of travel of said vehicle, (b) an elongated tubular reservoir positioned within said hollow tubular steering column, said reservoir containing prior to collision a pressurized fluid and having an outlet at the upper end thereof, said tubular reservoir being removable from said steering column longitudinally thereof, the lower end of said tubular reservoir being free of any connection to said steering mechanism, (c) an inflatable cushion mounted on said steering wheel and having an inlet, said inflatable cushion being inflated by pressurized fluid from said reservoir in the event of a collision to protect the driver of said vehicle from injury, (d) closure means interposed between the outlet of said reservoir and the inlet of said inflatable cushion and preventing the passage of pressurized fluid from said reservoir to said inflatable cushion, (e) opening means to rapidly open said closure means in response to a signal generated by said collision-sensing means thereby to rapidly inflate said inflatable cushion, (f) means for causing said reservoir to leak before bursting whereby, in the event of a flaw developing in the wall of said reservoir, said pressurized fluid will slowly leak through said flaw rather than catastrophically burst therethrough.

7. Apparatus as in claim 6, wherein:

(g) said closure means is a frangible plate which rapidly shatters into discrete fragments when struck, (h) said opening means comprises:

(i) a striking member having a first end to strike said frangible plate and a second end opposite said first end, (ii) driving means to rapidly apply a force to the second end of said striking member in response to a signal generated by said collision-sensing means to drive said striking member into shattering engagement with said frangible plate.

8. Apparatus as in claim 6, wherein:

(g) said closure means is a frangible plate having an upstream side facing the outlet of said reservoir and a downstream side opposite said upstream side, said frangible plate rapidly shattering into discrete fragments when struck, (h) said opening means comprises:

(i) a striking member adjacent the downstream side of said frangible plate and having a first end to strike said frangible plate and a second end opposite said first end, (ii) driving means to rapidly apply a force to the second end of said striking member in response to a signal generated by said collision-sensing means to drive such striking member into shattering engagement with said frangible plate.

9. Apparatus as in claim 6, wherein:

(g) said elongated tubular reservoir is flexible.

10. Apparatus as in claim 6, wherein:

(g) a generally annular space is provided between the lower portion of said elongated tubular reservoir and said steering column.

11. Apparatus as in claim 1, wherein:

(f) said elongated tubular reservoir is flexible.

12. Apparatus as in claim 1, wherein:

(f) a generally annular space is provided between the lower portion of said elongated tubular reservoir and said steering column.

* * * * *